Patented Jan. 2, 1940

2,185,280

UNITED STATES PATENT OFFICE 2,185,280

METHOD OF PRODUCING AN INORGANIC INSULATING MATERIAL

Karl Stuckardt, Berlin-Charlottenburg, and Reinhold Reichmann, Berlin, Germany, assignors to Westinghouse Electric & Manufacturing Company, East Pittsburgh, Pa., a corporation of Pennsylvania No Drawing. Application March 19, 1938, Serial No. 197,030. In Germany August 22, 1936

3 Claims. (Cl. 106—12)

The invention relates to insulating materials and more particularly to insulating materials composed of inorganic compounds.

It has formerly been proposed to produce an artificial inorganic insulating material by fusing together the component parts of mica—silicon components, metal oxides and other components—and to permit the fused material to cool slowly. This method of producing an artificial mica results in small crystals and also in a low yield. An improvement may be obtained if sodium calcium silicate is used to form a solution for the compounds of mica, such as magnesium oxide. Also, fluorides may be added to the material being fused to cause it to be less viscous.

The fusion temperatures necessary for the known methods of producing materials of the above-indicated character are undesirably high. The time necessary for the reaction to take place and the time required for cooling are very long, so that the crystallization process affects the materials of which the crucible is constructed in which the fusion process is carried out, appreciably attacking and dissolving such materials in the time required to carry out the process.

An object of the invention is the provision of an inorganic insulating material or artificial mica and a method of producing the same which overcomes the above-mentioned difficulties and results in the production of large surfaced easily split crystals.

Another object of the invention is the provision of an inorganic insulating material of the above character, in which the mineralizer, fluorine, is introduced exclusively in the form of potassium silicate fluoride.

Other objects of the invention will, in part, be obvious and, in part, appear hereinafter.

The method employed makes use of sodium calcium silicate as a means for dissolving the mica components. In accordance with the invention, the materials to be fused are combined in accordance with stoichiometric relationships. Following this rule, the charge should consist essentially of one, two and three valence metal compounds, such as metal oxides, metal fluorides, quartz and the alkali compounds. For the two and three valence compounds, preferably magnesium and aluminum compounds are used. The magnesium compounds may be replaced by calcium compounds and the aluminum compounds may be replaced by iron compounds. However, it is desirable to replace only a portion of the magnesium and aluminum compounds by the above-named substituted materials or by other two or three valence compounds. In accordance with the invention, the material which is mixed is so selected that the limit of the molecular relationships of the two and three valence metal radicals lie between 2:1 and 5:1.

It has further been found that crystallization is also influenced by the selection and amount of alkali compounds. Large surfaced crystals are obtained by using a potassium compound.

To obtain crystal leaves that are as large as possible, the content of fluorine is preferably selected to be not less than 8% by weight of the total charge of material to be fused. It is further desirable to introduce a portion of the fluoride directly into the mixture after the material being used has become colorless.

In the following, an exemplary embodiment of the invention is described more in detail. A charge having the following components is fused:

| | Per cent by weight |
|---|---|
| Sodium calcium silicate | 3– 7 |
| Potassium silicate fluoride | 15–30 |
| Aluminum oxide | 10–15 |
| Magnesium oxide | 25–30 |
| Quartz | 25–35 |

After the charge has become colorless, a further mass of potassium silicate fluoride is added which, for example, may amount to 7 to 12% by weight of the potassium silicate fluoride already present in the charge.

An accurate composition of an example corresponding to the above is as follows:

| | Per cent by weight |
|---|---|
| Sodium calcium silicate | 5.75 |
| Potassium silicate fluoride | 20.10 |
| Aluminum oxide | 11.10 |
| Magnesium oxide | 28.35 |
| Quartz | 32.70 |
| | 100.00 |

After the charge has become colorless, an additional 2.4% by weight of potassium silicate fluoride (equal to 2% of the original mass) is added. The hardening of this fusion takes place in a very small temperature range. The charge in this case has the characteristics of a well defined chemical compound. The solidification temperature is substantially 1260° C. It is not necessary to maintain the temperature above the solidification point for a relatively long time, as heretofore, for the purpose of producing a fusion of the mixture. The mixture may, on the contrary, be brought at once to the solidification temperature at which the crystallization takes place in known manner after the charge has become colorless, which is at 50 to 100° C. above the solidification point. The contamination of the materials being fused which is occasioned by solution of the crucible material when the charge is fused at very high temperatures for long periods of time does not occur at the low temperatures employed and the short times involved, so that the hardened mass consists of pure, well constructed, easily split crystals.

In accordance with the invention, fluorine is employed as a mineralizer and is introduced only in the form of potassium silicate fluoride to act upon the fusible fluxes.

Potassium silicate fluoride decomposes at about 600° C. It has previously been supposed that in order to insure a sufficient supply of fluorides in the fusible fluxes at the high temperature employed, the addition of magnesium fluoride was indispensable. Magnesium fluoride fuses at about 908° C.

Recent experiments have discolsed that, contrary to previous suppositions, the addition of magnesium fluoride is not necessary. Furthermore, it has been discovered that by using potassium silicate fluoride as the only carrier of the mineralizer fluorine, the desired hardness and crystal size is more readily realized in the resulting material. Accordingly, it is desirable to employ only potassium silicate fluoride and no magnesium fluoride as the mineralizing agent.

Since certain changes may be made in the material and in the method of producing the same without departing from the scope of the invention, it is intended that all matter contained in the above description shall be interpreted as illustrative and not in a limiting sense.

We claim as our invention:

1. The method of producing inorganic insulating materials which consists in mixing a charge of 3 to 7 parts by weight of sodium calcium silicate, 15 to 30 parts by weight of potassium silicate fluoride, 10 to 15 parts by weight of aluminum oxide, 25 to 30 parts by weight of magnesium oxide, and 25 to 35 parts by weight of quartz, fusing them at a temperature between 1310° and 1360° C. until the mixture becomes colorless, and adding a further mass of 2 to 3 parts by weight of potassium silicate fluoride.

2. The method of producing inorganic insulating materials which consists in mixing a charge of 3 to 7 parts by weight of sodium calcium silicate, 15 to 30 parts by weight of potassium silicate fluoride, 10 to 15 parts by weight of aluminum oxide, 25 to 30 parts by weight of magnesium oxide, and 25 to 35 parts by weight of quartz, fusing them at a temperature above 1260° C. until the fusion becomes colorless, and adding 7 to 15% more potassium silicate fluoride to the mass after the fusion has become colorless.

3. The method of producing inorganic insulating material which consists in mixing a charge of substantially 5.75% by weight of sodium calcium silicate, 20.10% by weight of potassium silicate fluoride, 11.10% by weight of aluminum oxide, 28.35% by weight of magnesium oxide, and 32.70% by weight of quartz, fusing them at a temperature above 1260° C. until the mixture becomes colorless, and adding a further amount of potassium silicate fluoride equal to substantially 2% by weight of the original mass.

KARL STUCKARDT.
REINHOLD REICHMAN.